Sept. 30, 1924.
S. C. BURRULL
TOOL
Filed April 8, 1922
1,510,037
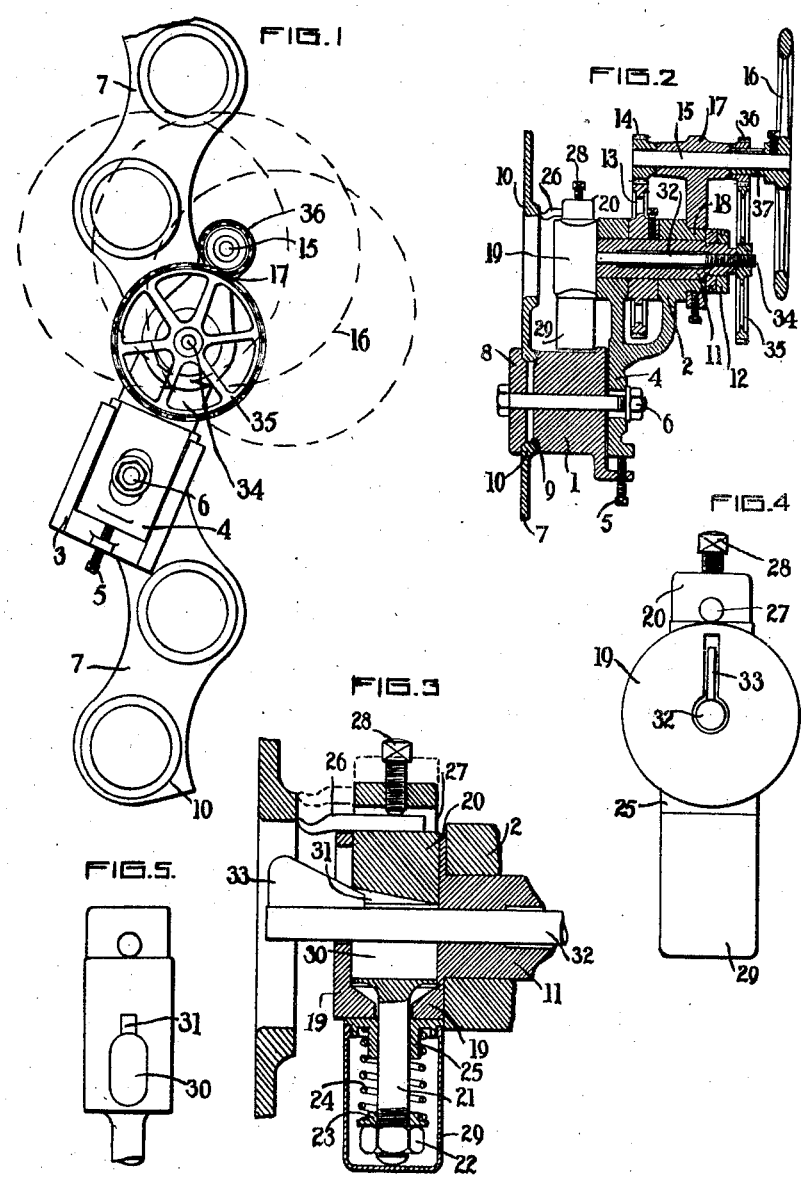
Inventor
S. Carrisé Burrull
by
W. E. Evans
Attorney.

Patented Sept. 30, 1924.

1,510,037

UNITED STATES PATENT OFFICE.

SALVADOR CARNISÉ BURRULL, OF BARCELONA, SPAIN.

TOOL.

Application filed April 8, 1922. Serial No. 550,728.

*To all whom it may concern:*

Be it known that I, SALVADOR CARNISÉ BURRULL, a subject of the King of Spain, residing at 154 Galileo, Tarrasa, Barcelona, Spain, have invented certain new and useful Improvements Relating to Tools, of which the following is a specification.

In tubular steam boilers of the Babcock and Wilcox type and other similar types, the vaporization tubes are provided in groups and the tubes of each group are connected together by means of connecting pieces or flanges to which the said tubes are secured, the said flanges presenting at the same time and corresponding to each of the tubes, a register for inspection and cleaning thereof, such registers being closed by means of suitable covers.

In the construction of such steam boilers it is necessary to ensure a perfect closure in the registers referred to. This is effected with the necessary precision when the boiler is new but after the seats for the covers and the flanges have corroded in use, it has not hitherto been possible to restore a perfect closure in re-making a new adjustment of the seats.

When the seats are out of order, the joint is repaired by interposing between the seats a suitable composition to render the joints tight or in polishing or machining the seat of the flange but neither the application of compositions prevents leaks nor has there been constructed up to the present any apparatus capable of effecting in a rapid and perfect way the necessary machining of the seats. In the use of the apparatus according to the invention on the other hand, this is effected and the seats are rendered perfectly flat and perpendicular to the axis of the tubes which are mounted upon the corresponding flange.

According to the invention a support is provided which is rigidly mounted in one of the register orifices and upon which is carried a tool carrier having a tool to which a circular movement is given as well as an automatic radial movement whereby the tool passes over the whole surface of the seat which is to be machined and consequently becomes perfectly flat and perpendicular to the axis of the tube as a consequence of the manner in which the apparatus is rigidly mounted upon the flange.

In the accompanying drawing is represented by way of example a form of construction of apparatus embodying this operation.

Figure 1 is a front view of the apparatus mounted in position.

Figure 2 is a vertical section corresponding thereto.

Figures 3, 4 and 5 are detail views on a larger scale of the tool holder.

The body of the apparatus is formed by supports 1 and 2, the first of which is provided with guides 3 in which the extension 4 of the second may slide, the relative position of the two being determined by means of a screw 5 and being rigidly fixed by means of a bolt 6 which at the same time serves to retain the whole body formed by the two supports to the flange or connecting member 7. This retention is effected by means of a plate 8 of suitable form. The support 1 is provided with a seat 9 which is applied against one of the seats 10 of the flange whereby the exact perpendicular relation of the plane of the seats 10 is ensured with respect to the axis of the spindle which is mounted upon the said support 2.

In the support 2 is mounted a spindle 11 which is retained in position by means of nuts 12 and carries secured to it a wheel 13 gearing with a pinion 14 fixed upon a spindle 15, which latter has mounted upon it an operating fly-wheel 16. The spindle 15 is mounted upon a supporting bracket 17 and this latter is mounted in turn upon an extension 18 of the support 2, its position being capable of variation as indicated in dotted lines in Figure 1 according to the position of the seat which is to be rectified.

The spindle 11 is provided at the position opposite to the nuts 12 with an enlarged part 19 in which is disposed the tool carrier 20 and this latter is provided with an extension 21 in part screw threaded which has mounted upon it a nut 22 and a disc 23 against which abuts a spiral spring 24, the opposite end of which engages with the enlarged part 19 which is also provided with an abutment disc 25 for the reception of the end of the spiral spring. By the action of the spring the tool carrier 20 and the tool tend continually to occupy the lowest position. The tool 26 is mounted within a cavity 27 provided in the upper end of the tool carrier and is held in position by means of the screw threaded stud 28. A cover 29 secured to the disc 25 serves to protect the spring 24 and the other adjacent parts.

Within the tool carrier 20 is provided a groove 30 (Figure 6) within which is formed at its upper part an inclined part 31. The spindle 11 is hollow and through its bore a rod 32 passes which is provided integral at one end with a key 33 of a trapezoidal form. This rod passes with its key through the groove 30 and the inclined part 31. The rod 32 is provided at its other extremity with a screw threaded part 34 (Figure 2) upon which is threaded the wheel 35 in the manner of a nut. The wheel 35 gears with the pinion 36 mounted upon an extension 37 of the boss of the operating fly-wheel 16.

By the operation of the fly-wheel 16 the rotation of the spindle 11 is effected through the gears 13 and 14 and thus a circular movement is imparted to the tool 26 whereby also the rod 32 is rotated but as upon the latter is mounted the wheel 35 and the relation of the gears 13—14 and 35—36 is not the same, the wheel 35 under the action of its corresponding pinion 36 turns slower or faster than the rod 32 and this difference of speed causes the relative rotation of the rod 32 by reference to the wheel 35 which operating as a fixed nut causes the longitudinal displacement of the rod 32 whose key 33 passes through the inclined part 31 and causes the radial movement of the tool carrier 20 and with it the radial movement of the tool 26, so that thus the tool comes to occupy the extreme position indicated in dotted lines in Figure 3 after having passed over the face of the seat 10.

The relation between the speed of the tool and its advance may be varied, it being only necessary to modify the relation between the pinion and wheel 35—36.

It will be understood that the apparatus described may be modified with respect to the disposition and form of the elements of which it is composed without avoiding the essential feature of the invention.

I claim:

1. Apparatus for machining the seats of flanges in tubular boilers, comprising in combination a support, a tool carrier mounted on said support, gearing for causing the rotation of the said tool carrier, means for causing the continuous feed in a radial direction of the tool carrier, consisting of a screw threaded spindle, means for causing the continuous axial movement of the said spindle on its rotation by the said gearing, and means for causing the radial movement of the said tool carrier on the axial movement of said spindle, substantially as described.

2. Apparatus for machining the seats of flanges in tubular boilers, consisting of a support, a rotatable tubular spindle carried by the said support, a tool carrier mounted upon the said tubular spindle, means for rotating the said tubular spindle and tool carrier, a centrally disposed screw threaded spindle within the said tubular spindle, gearing for causing the rotation of the said tubular spindle, means deriving movement from the said gearing for effecting the axial movement of the said screw threaded spindle, and a member upon the said screw threaded spindle having an inclined surface for engaging with an inclined surface upon the said tool carrier, substantially as described.

3. Apparatus for machining the seats of flanges in tubular boilers, consisting of a support, a rotatable tubular spindle carried by the said support, a tool carrier mounted upon the said tubular spindle, means for rotating the said tubular spindle and tool carrier, a centrally disposed screw threaded spindle within the said tubular spindle, gearing for causing the rotation of the said tubular spindle, means deriving movement from the said gearing for effecting the axial movement of the said screw threaded spindle, a member upon the said screw threaded spindle having an inclined surface for engaging with an inclined surface upon the said tool carrier, and a spring by which the tool carrier is normally held in its innermost position, substantially as described.

SALVADOR CARNISÉ BURRULL.